United States Patent [19]

Piani et al.

[11] Patent Number: 5,104,860

[45] Date of Patent: Apr. 14, 1992

[54] HEPARIN DERIVATIVES AND PROCESS FOR THEIR PREPARATION

[75] Inventors: Silvano Piani, Bologna; Gianfranco Tamagnone, Casalecchio di Reno; Raul R. Alpino, Bologna; Maria R. MIlani, Trebbo di Reno, all of Italy

[73] Assignee: Alfa Wassermann S.p.A., Pescara, Italy

[21] Appl. No.: 462,462

[22] Filed: Jan. 9, 1990

[30] Foreign Application Priority Data

Jan. 30, 1989 [IT] Italy .................. 3328 A/89

[51] Int. Cl.$^5$ ................. A61K 31/725; C08B 37/10
[52] U.S. Cl. ........................... 514/56; 536/21; 536/55.3
[58] Field of Search ............ 514/54, 56; 536/21, 536/55.3

[56] References Cited

U.S. PATENT DOCUMENTS

| | | | |
|---|---|---|---|
| 3,862,003 | 1/1975 | Okuyama et al. | 536/21 |
| 4,438,108 | 3/1984 | Sanders et al. | 514/56 |
| 4,791,195 | 12/1988 | Bianchini et al. | 536/21 |
| 4,816,446 | 3/1989 | Feller et al. | 536/21 |
| 5,010,063 | 4/1991 | Piani et al. | 536/21 |

FOREIGN PATENT DOCUMENTS

| | | | |
|---|---|---|---|
| 0040144 | 11/1981 | European Pat. Off. | 536/21 |
| 0287477 | 10/1988 | European Pat. Off. | 536/21 |
| 0347588 | 12/1989 | European Pat. Off. | 536/21 |
| 0380943 | 8/1990 | European Pat. Off. | 536/21 |

OTHER PUBLICATIONS

Bowyer et al.; Clinica Chimica Acta, 95(1979) 23–28.
Baggio et al., Acta Medica, Int'l. Meeting, Bologna, 9/87-211-213.
Baggio et al., The Lancet, Aug. 7, 1984—12-13.
Baggio et al., IRCS Med. Sci., 14, 368–369 (1986).
Hirano et al., Connective Tissue Research, 1975, vol. 3, pp. 73–79.
Sampson et al., Proc. Nat. Acad. Sci. U.S.A., vol. 68, No. 10, Oct. 1971, pp. 2329–2331.
Braud et al., Macromolecules 1985, 18, 856–862.
Fransson et al, Biochem J. (1978), 175, 299–309.
Fransson, Carb. Res. 62:235–244 (1978).
Kosakai et al., J. Biochem. 86:147–153 (1979).
Fellstroem et al., Chemical Abstracts 105:4582a (1986).
Ayotte et al, Carb. Res. 145:267–277 (1986).
Wright, Jr. et al., J. Biol. Chem. 264(3):1534–1542 (1-2-5-89).

Primary Examiner—Johnnie R. Brown
Assistant Examiner—Nancy S. Carson
Attorney, Agent, or Firm—Bucknam and Archer

[57] ABSTRACT

New heparinic derivatives having anticalculous activity, devoid of the anticoagulant and antithrombotic activity characteristic of the heparins, obtained by treating commercial or purified or low molecular weight heparins in a basic meidum, optionally in the presence of alkali metal salts and of a reducing agent. The heparinic derivatives obtained through this treatment show significant chemical-physical characteristics, in particular they present a $^{13}$C-NMR spectrum different from that of the starting heparins especially in the zone between 102 and 92 p.p.m. with a characteristic signal at 101.3 p.p.m., a specific rotatory power at 546 nm between about +15° and about +40° in aqueous solution, a sulfur content between about 6% and about 9%, a sulfate/carboxyl ratio between about 1.20 and about 1.70 and a content of free amino groups between about 0.4% and about 2.1%. These heparin derivatives can be useful in the treatment of the nephrolithiases.

13 Claims, No Drawings

HEPARIN DERIVATIVES AND PROCESS FOR THEIR PREPARATION

BACKGROUND OF THE INVENTION

The present invention relates to new heparinic derivatives having a modified structure, obtained by treating commercial or purified or low molecular weight heparins in a basic medium, optionally in the presence of a salt and of a reducing agent.

These new heparinic derivatives can also be obtained by heating the heparinic derivatives described in the Italian patent application No. 3504 A/88 filed on June 10, 1988, in a neutral or basic medium, optionally in the presence of a salt or of a reducing agent. The new heparin derivatives possess chemical-physical properties different both from those of the commercial heparins and from those of the heparinic derivatives described in the Italian patent application No. 3504 A/88 and moreover they show biological activities different from those of both the classes of products above mentioned. In particular, the new derivatives do not hold the anticoagulant activities typical of the heparinic structures, while they keep unchanged or even enhanced peculiar biological activities like, for instance, the anticalculous activity, which makes them suitable as drugs for the cure and the prevention of the nephrolithiases. Bowyer R. G. et al, Clin. Chim. Acta, 95, 23, (1979) demonstrated that the heparin is a strong inhibitor of the formation and of the aggregation of the crystals of calcium oxalate, while Baggio B., Int. Meeting on: "Inhibitors of crystallization in renal lithiasis and their clinical application" Bologna, Sept. 7-9, (1987), showed that heparin lowers the urinary excretion of the oxalate. The heparin is therefore a potential drug against the calculosis, but, due to its specific anticoagulant and antithrombotic activities, it cannot be used in the nephrolithiases in general and in those calcium-oxalic acid conditions in particular. The new products described in the present invention, on the contrary, can be used in the treatment of nephrolithiases, which are chronic diseases that require prolonged treatments with highly specific drugs devoid of side effects, because they do not more possess the anticoagulant properties typical of heparin.

The heparinic derivatives object of the present invention possess chemical-physical properties totally different from those of the products described by Mardiguian J. S. in the European patent publication EP0133078 and by Hirano S. et al. in Conn. Tissue Res, 3, 73–79, (1975) as shown by the average molecular weight which remains substantially unchanged, so proving the lack of depolymerization, and by the lack of absorption at 225-230 nm in U.V. and of peaks corresponding to the resonances of the double bond in the $^{13}$C-NMR spectrum, indexes of the lack of the double bond in the positions 4 and 5 of the uronic acid. Moreover they do not even show the chemical-physical properties of the compounds isolated by Sampson P. and Meyer K. in Proc. Nat. Acad. Sci. U.S.A. 68, 2329-31, (1971) as the $^{13}$C-NMR spectrum of the compounds obtained in the present invention shows unchanged the position and the intensity of the signal of the carbon atom in position 6 of the glucosamine and shows unchanged the intensity ratio between the 6-sulfated carbon atom and the 6-desulfated carbon atom that should change in case of formation of 3,6-anhydroglucosamine because of the participation of the 6-sulfated carbon atom in the formation of the anhydroderivative. Lastly, the products object of the present invention differ in the chemical-physical properties from those claimed in the Italian patent application No. 3504 A/88 as shown, for instance, by the lack of the peaks at about 53 and 54 p.p.m. in the $^{13}$C-NMR spectrum.

SUMMARY OF THE INVENTION

The present invention refers to new heparin derivatives, to their therapeutic use in the treatment of the nephrolithiases and to the process for their preparation by means of a chemical modification made by heating commercial heparins of various origin, or purified heparins or low molecular weight heparins in basic medium, optionally in the presence of salts and of a reducing agent.

These new heparin derivatives can also be obtained by heating the heparin derivatives described in the Italian patent application No. 3504 A/88 in neutral or basic aqueous medium, optionally in the presence of salts and of a reducing agent. The reaction of chemical modification is carried out through a basic treatment at high temperature of commercial or purified or low molecular weight heparins, with a process similar to that described in the Italian patent application No. 3504 A/88. In the process object of the present invention, some fundamental parameters, mainly the temperature and/or the time, are modified in an adequate manner with respect to the process described in the above mentioned Italian patent application. More specifically, the temperature is raised and/or the time is prolonged in comparison with the previous process so that the commercial or purified or low molecular weight heparins, through two consecutive reactions which take place in the same medium, are first transformed into one of the products claimed in the above mentioned Italian patent application and then, after a further chemical modification, into one of the products described in the present invention.

In other words, the peculiar conditions of the reaction allow not only the transformation of the starting heparin into an intermediate compound having the characteristics described in the Italian patent application No. 3504 A/88, but they also cause the subsequent transformation of this intermediate into an end compound having the chemical-physical characteristics described in the present invention. It is evident that, dependent upon the specific effective conditions selected, the intermediate compound can be present during the reaction in more or less high concentration and also in so low concentration that it cannot be detected by means of the available chemical-physical methods. Moreover also other parameters can be used in addition to the temperature and the time; for instance, also the concentration of the base can shift the equilibrium of the reaction towards the formation of the compounds object of the present invention instead of towards the formation of the compounds claimed in the Italian patent application No. 3504 A/88. In fact the equilibria of the reaction are clearly dependent on all the parameters of the reaction and therefore they change in accordance with the changes of the parameters. Therefore the greater importance attributed to determine parameters, first the temperature and second the time, has to be interpreted in operative and illustrative, but not surely limiting, terms.

The reaction of chemical modification can also be carried out by using as starting products the compounds obtained according to the method described in the Italian patent application No. 3504 A/88. In this second case, these compounds are heated in neutral or basic aqueous medium, optionally in the presence of a salt and of a reducing agent.

Lastly, the chemical reaction of modification can be carried out without isolating the above mentioned products, namely it can be directly carried out on the reaction mixture obtained according to one of the processes described in the Italian patent application No. 3504 A/88. In this case the intermediate reaction mixture can be submitted to chemical treatments which enable to create the chemical medium necessary for the new reaction, such as, for instance, corrections of pH by means of acids, bases or ionic exchange resins, removal of salts by means of dialysis or ionic exchange resins or gel columns, addition of salts or combinations thereof.

The so obtained new products having modified heparin structure, possess chemical-physical properties, like specific rotatory power and $^{13}$C-NMR signals, which differ both from those of the starting compounds and from those of the products claimed in the Italian patent application No. 3504 A/88. In particular, they are characterized in that they show $^{13}$C-NMR signals completely different from those of the commercial heparins in the zone between 102 and 92 p.p.m., where the peaks of the anomer carbons appear, and in that the peaks at about 53 and 54 p.p.m., typical of the product described in the above mentioned Italian patent application, are absent. Moreover, the new products are characterized by the lower value of the specific rotatory power (about 20°-30° less) in comparison with the starting commercial heparins. The decrease of the specific rotatory power is still greater if referred to the compounds described in the above mentioned Italian patent application, which showed values higher than those of the starting commercial heparins.

The chemical modification of the commercial or purified or low molecular weight heparins, is obtained at high temperatures and/or for long time in aqueous medium in the presence of a base, preferably of an alkali or alkali-earth metal hydroxide, optionally in the presence of a salt of an alkali or alkali-earth metal and of a reducing agent preferably sodium borohydride.

The bases and the salts of alkali or alkali-earth metals preferably used are those of sodium, potassium, calcium, magnesium and barium.

The hydroxides of sodium, potassium and barium are preferably used as the bases.

The acetates and chlorides of sodium, potassium, barium, calcium and magnesium and the sulfates of sodium, potassium and magnesium can be advantageously used as salts.

The commercial or purified or low molecular weight heparin is dissolved in an aqueous solution from about 0.01N to about 1N of a base of an alkali or alkali-earth metal, preferably sodium hydroxide, optionally in the presence of a salt of an alkali or alkali-earth metal, at a concentration equal or lower than 1N, and of a catalytic amount of a reducing agent, preferably sodium borohydride. The solution is thermostated at a temperature between about 75° C. and the boiling temperature of the reaction mixture for a period of time between about 0.5 and about 24 hours. At the end of the reaction, the solution is cooled at room temperature, brought to neutral pH and optionally submitted to a purification treatment, for instance to a passage through ion exchange columns or to dialysis, and lastly the modified heparinic product is obtained by precipitation by adding from about 2 to about 4 volumes, preferably 2.5 volumes, of an alcohol containing from 1 to 3 carbon atoms like, for instance, ethyl alcohol, or by freeze-drying.

The new heparin derivatives object of the present invention can also be obtained by using as starting compounds the heparin derivatives obtained according to the Italian patent application No. 3504 A/88, or the reaction mixture of said application.

In the first case, the heparin derivative is dissolved in water or in an aqueous solution of a base of an alkali or alkali-earth metal from about 0.01N to about 1N, optionally in the presence of a salt of an alkali or alkali-earth metal, at a concentration lower or equal to 1N, and of a catalytic amount of a reducing agent, and the solution is thermostated at a temperature between about 75° C. and the boiling temperature of the reaction mixture for a period of time between about 0.5 and about 24 hours.

In the second case, the reaction mixture obtained according to said Italian patent application, optionally modified, for instance by correcting the pH of the solution, also till neutrality, by adding an acid, like hydrochloric or acetic or propionic acid, or removing the salt and the reducing agent in case present by means of dialysis or by a passage first through an anionic resin and then through a cationic resin or by gel-filtration, or appropriately combining two or more of the above mentioned treatments, is thermostated at a temperature comprised between about 75° C. and the boiling temperature of the reaction mixture for a period of time comprised between about 0.5 and about 24 hours.

In both cases, the desired final product is isolated at the end of the reaction as previously described.

The modified heparins obtained according to the process described in the present invention show some peculiar chemical-physical characteristics which are completely different from those resulting from the alkaline treatments known from the prior art.

The structural changes of the new heparin derivatives in comparison with the starting heparins were particularly shown from the position and the relative intensity of the resonance in the $^{13}$C-NMR spectrum, from the electrophoretic behaviour, from the decrease of the values of the specific rotatory power and from the decrease of the content of sulfur and of the sulfate/carboxyl ratio, being remained unchanged the content of the carboxyl, and from the presence of a certain amount of free amino groups.

The more characteristic modifications in the structure of the new heparinic derivatives were determined through the study of the great changes in the $^{13}$C-NMR spectrum. These variations refer to some fixed zones of the spectrum and involve both the appearance of new peaks and the modification or the disappearance of other peaks. The shifts of the signals corresponding to the carbon 1 of the iduronic and glucosaminic units in the zone between 92 and 102 p.p.m. both versus the commercial heparins and versus the products described in the Italian patent application No. 3504 A/88 are of special importance. Also the disappearance of the two signals at about 53 and 54 p.p.m., characteristic of the heparin derivatives described in the above mentioned Italian patent application is of special importance.

In particular, a new peak at about 101.3 p.p.m. is present in comparison with the commercial heparins. The comparative examination of the $^{13}$C-NMR spectra of the new products and of those of the starting compounds enable to establish that some zones of the spectrum remained unchanged and therefore that specific portions of the heparinic structure were not modified at all. In particular, the signals related to the position 6 of the sulfated or desulfated glucosaminic units were not modified. Moreover, the peaks related to the position 2 of the sulfated glucosaminic units, to the carboxyl of the iduronic acid and to the units of the glucuronic acid, which in the heparin constitutes an average of 20% of the uronic residues, are modified.

Moreover the new modified heparins are characterized in that they have an electrophoretic behaviour, in the barium acetate buffer 0.1M at pH 5.8, different from that of the starting product, i.e. they have a mobility higher than that of the commercial heparins and lower than that of the heparins modified described in the Italian patent application No. 3504 A/88.

The new heparins are characterized by a sulfur content comprised between about 6% and about 9%, a sulfate/carboxyl ratio between about 1.20 and about 1.70, a specific rotatory power at 546 nm between about $+10°$ and about $+40°$ in aqueous solution, a specific rotatory power at 589 nm between about $+20°$ and about $+30°$ in aqueous solution and a value of the free amino groups between about 0.4% and about 2.1%.

The chemical modification is evaluated in different manners dependent upon the methods used in the preparation.

When the products claimed in the present patent application are obtained from the commercial heparins, it is necessary to compare the chemical-physical characteristic both with respect to the starting heparin and to the modified heparin claimed in the Italian patent application N. 3504 A/88 which forms as intermediate compound. In case the $^{13}$C-NMR is considered, it is necessary to take into account the overall changes which take place in the entire spectrum and especially in the interval of the anomer carbons between 102 and 92 p.p.m., as it appears obvious to one skilled in the art from the examination of the values of the resonances quoted in the examples of the experimental part of the present patent application. For expediency, the changes of the specific rotatory power at 546 or at 589 nm can be taken into account in order to follow the progress of the reactions.

In fact, the values of the specific rotatory power taken at different times show characteristic changes which are dependent upon the reaction conditions. Generally, the [α] values in a first time increase and in a second time decrease, as it clearly appears from table 1, where the values of the specific rotatory power at 589 and 546 nm, measured at different times, of a 4% solution of a commercial heparin in 1N sodium hydroxide thermostated at the temperature of 80° C., are reported. The measure of the values of the rotatory power enables to differentiate in an evident manner the chemical modification claimed in the present patent application from that claimed in the Italian patent application No. 3504 A/88, as it clearly appears from tables 2 and 3. The reported values show that the modification claimed in the present invention does not take place, in a significant manner, at the lower temperature, i.e. at 60° C., also at the longer times, while, on the contrary, the modification claimed in the above mentioned Italian patent application cannot be noticed in a significant manner at the higher temperature, i.e. at 95° C.

Both the progressive disappearance of the peaks at about 53 and 54 p.p.m. in the $^{13}$C-NMR spectrum and the decrease of the specific rotatory power can be taken into account when the heparin derivatives object of the present invention are obtained starting from the products claimed in the Italian patent application No. 3504 A/88, either after their isolation or through a suitable chemical treatment of the intermediate reaction mixture. In the first case, the ratio between the sum of the integrals of the peaks at about 53 and 54 p.p.m. and the sum of the integrals of the peaks of the carbon in the position 6 of the glucosamine, at about 62.5 and 69 p.p.m., is considered. The peaks at about 62.5 and 69 p.p.m. are selected, as an arbitrary reference, because their intensity remains constant and because they are in a zone of the spectrum free from other peaks.

The value of this ratio decreases during the reaction till zero at the end of the reaction. Alternately, the value of the specific rotatory power, which gradually decreases until a constant value, can be taken into account, because a decrease of the rotatory power at 589 nm takes place parallelly to the lessening of the resonances at about 53 and 54 p.p.m.

The new heparin derivatives, object of the present invention, possess a noteworthy anticalculous activity together with a strong reduction of the biological activities typical of the starting heparins. The anticalculous activity was measured by means of two specific biological tests: the determination of the transmembrane flux of the oxalate carried out according to the method described by Baggio B., et al., Lancet 1984, (II), 12–14 and the study of the phosphorylation of the proteins of membrane according to the description of Baggio B. et al., IRCS Med. Sci. 14, 368, (1986). The results were expressed as percent inhibition caused by the products described in the present invention versus the controls on the transmembrane flux of the oxalate and, respectively, on the phosphorylation of the proteins of membrane, on erythrocytes coming from calculous idiopathic patients. The erythrocitary flow of the oxalate was determined, after 12 hours of nocturnal fasting, as follows: 10 ml of venous blood collected in heparinized test-tubes were washed three times in a solution containing 150 mM of NaCl, 10 mM of KCl and 20 mM of TRIS HCl (pH 7.4). The samples were then suspended to a 50% haematocrit in the same solution to which was added 10 mM of sodium oxalate. This cellular suspension was then incubated at room temperature for two hours. The subsequent steps were carried out at 4° C. After centrifugation, the erythrocytes, suspended to a 20% haematocrit in the previously described solution, were divided in many portions to which were added some $^{14}$C oxalate (8,000–10,000 c.p.m.). After 10, 20, 30, 60, 90, 120 minutes and 24 hours, the corresponding portion was centrifuged and the $^{14}$C activity in beta counter was determined on the supernatant. The flow constant of exchange of the oxalate was evaluated from the inclination of the linear function $$\ln(A_t - A_{oo})/(A_0 - A_{oo}) = -Kt$$

where t indicates the time, K the flow constant, and A the amount of oxalate at the times 0, t and at the isotopic equilibrium (oo).

Ghosts coming from patients suffering from calcic idiopathic nephrolithiases with abnormal transmembrane flux of the oxalate were used for the study of the phosphorylation of the proteins of membrane. The endogenous phosphorylation of the ghosts was obtained at 37° C. with varying times of incubation in a medium containing 100 mM of TRIS HCl pH 7.5, 8 mM of MgCl$_2$, 2 mM of ($^{32}$P)ATP, about 50 μg of proteins of membrane in a final volume of 125 μl. The incubation was interrupted by adding 2% sodium dodecylsulfate and 1% mercaptoethanol, followed by boiling at 100° C. for 5 minutes. Then 20 μl of a saturated solution of saccharose and 12 μl of 0.05% pyronine as tracer were added. Aliquotes of about 20 μg of so treated proteins were submitted to electrophoresis on SDS-polyacrylamide gel. The gels were then coloured by means of Coomassie Blue, dried and then put on autoradiography for about 20 hours. The autoradiograms were then read by means of a densitometer for the quantification of the incorporation of the $^{32}$P to the proteic bands.

The other biological activities were determined through many tests typical of the heparins. In fact the test related to the anti-Xa factor, the APTT, the bleeding time and the protection from the experimental thrombosis were carried out. The APTT activity was determined according to the method of Larrieu M. J. and Weiland G., Rev. Hematol., 12, 199, (1957), while the anti-Xa activity was determined according to the method of Yin E. T. and Wessler S., Biochem. Biophys. Acta, 201, 387, (1970).

Each product under examination was dissolved in plasma taken from fasted rats; subsequently scalar dilutions were made in order to obtain the concentrations provided for in the method. Ten determinations for each product were carried out for both the activities. The amount, as mcg/ml, which determines a highly significant variation in the respective test, was evaluated for each product. In particular, the activity of each product was expressed in terms of concentration, as mcg/ml, which respectively doubles the APTT time and increases of 30% the value of anti-Xa. The values obtained in the two tests confirm that the new products show a decrease of the anticoagulant power.

The bleeding time was carried out in the rat according to the method described by Dejana E. et al., Thromb. Haemost. 48, 108, (1982) and the result was expressed by calculating the percent of the time of prolongation of the bleeding in the rats treated with the new heparins versus the time of prolongation of the bleeding of the control rats and comparing them with the times of prolongation of the corresponding starting heparins administered at the same dosage (1 mg/Kg/i.v.).

The antithrombotic activity was evaluated by means of the test of the stasis venous thrombosis described by Reyers S. et al., Thromb. Res. 18, 669-674, (1980). The protection given by the new products has been evaluated, as percent, by considering equal to 100 the antithrombotic protection given by the starting products.

The results obtained showed an improvement or a substantial equivalence of the two types of heparins as it refers to the tests on the anticalculous activity. On the contrary, the anticoagulant activities, shown by the specific tests for the commercial heparins, are practically absent in the new heparins.

The values of the above mentioned biological tests are reported in the experimental section together with the chemical-physical characteristics.

These new heparin derivatives can be useful in the treatment of the renal pathologies and particularly in the nephrolithiasis. The preferred routes of administration are those typical of the heparins, i.e. the parenteral and the subcutaneous routes in the form of aqueous sterile solutions optionally containing also some salts to make isotonic the solution and some preserving agents.

The heparin derivatives object of the present invention can be administered also by other routes, preferably as gastroresistant pharmaceutical formulations.

Either commercial heparin, or heparins purified by treatment of commercial sodium heparin, or low molecular weight heparins obtained by depolymerization according to methods known in the art, were used to obtain the modified heparins object of the present invention. The methods of purification and of depolymerization of the used heparins are reported before the examples which further illustrate the invention, but should not be considered as a limitation. The determination of the sulfate/carboxyl ratio was carried out by potentiometric route. The percent determination of sulfur was carried out both with the potentiometric and the Schoeniger method. The $^{13}$C-NMR spectra were carried out at 75.47 MHZ with a Varian CFT-75 spectrometer by using D$_2$O as solvent and the sodium 3-trimethylsilylpropansulfonate as reference internal standard.

TABLE 1

Variations of the values of the specific rotatory power at 589 and 546 nm of a 4% solution of commercial ALFA 87-163 heparin in 1 N aqueous NaOH thermostated at the temperature of 80° C.

| Time | $\Delta [\alpha]_{1\%}^{20°}$ | |
|---|---|---|
| (h) | 589 nm | 546 nm |
| 0 | 0 | 0 |
| 15' | 37 | 32 |
| 30' | 39 | 36 |
| 45' | 41 | 38 |
| 1 h | 43 | 39 |
| 2 h | 14 | 14 |
| 3 h | 9 | 1 |
| 4 h | −11 | −12 |
| 5 h | −15 | −17 |
| 6 h | −19 | −19 |
| 7 h | −20 | −26 |
| 8 h | −25 | −30 |

TABLE 2

Values of the specific rotatory power at 546 nm of a 4% solution of commercial ALFA 87-163 heparin in 0.225 N aqueous NaOH at different times and temperatures.

| Time | $[\alpha]_{1\%}^{20°}$ Temperature °C. | | |
|---|---|---|---|
| (h) | 60 | 80 | 95 |
| 0 | | | |
| 1 | 63 | 69 | 55 |
| 2 | 65 | 70 | 46 |
| 3 | 71 | 72 | 33 |
| 4 | 66 | 61 | 24 |
| 5 | 76 | 58 | 25 |
| 6 | 77 | 57 | n.d. |
| 7 | 80 | 50 | n.d. |
| 8 | 83 | 45 | n.d. |

TABLE 3

Values of the specific rotatory power at 546 nm of a 4% solution of commerical ALFA 87-163 heparin in 1 N aqueous NaOH at different times and temperatures.

| Time | $[\alpha]_{1\%}^{20°}$ Temperature °C. | |
|---|---|---|
| (h) | 60 | 80 |
| 0 | 60 | 60 |
| 1 | 82 | 99 |
| 2 | 93 | 74 |
| 3 | 97 | 61 |
| 4 | 93 | 48 |

TABLE 3-continued

Values of the specific rotatory power at 546 nm of a 4% solution of commercial ALFA 87-163 heparin in 1 N aqueous NaOH at different times and temperatures.

| Time (h) | $[\alpha]_{1\%}^{20°}$ Temperature °C. | |
|---|---|---|
| | 60 | 80 |
| 5 | 88 | 43 |
| 6 | 89 | 41 |
| 7 | 78 | 34 |
| 8 | 83 | 30 |

Sodium heparin ALFA 87-81

50 grams of commercial sodium heparin are dissolved in 4000 ml of water and poured over a period of about 30 minutes into a solution containing 222.4 g of calcium acetate monohydrate in 4000 ml of water, 114 ml of acetic acid and 1200 ml of ethyl alcohol, while keeping the temperature at about 8°–10° C. The obtained suspension is filtered after 15 hours at 5° C. and to the filtrate is added 2000 ml of ethyl alcohol and after 3 hours at 5° C. the precipitate obtained is filtered. The precipitate is then dissolved in 400 ml of water, the solution is brought to pH 7.0 by means of 1N sodium hydroxide and then it is treated with 200 ml of Dowex 50W X8, resin sodium form, resin and with 140 ml of water for 20 minutes. This solution and resin are transferred into a chromatographic column ($\phi = 4$ cm, h = 13 cm) containing 160 ml of the same resin. After having percolated the solution and eluted with distilled water until a total volume of solution equal to 800 ml, to the solution is added 24 g of sodium acetate trihydrate and 2000 ml of ethyl alcohol. The precipitate is filtered and dried under vacuum obtaining 36.5 g of purified sodium heparin named ALFA 87-81 having the following chemical-physical characteristics:

$^{13}$C-NMR spectrum (p.p.m.): 177.3; 104.7; 102.0; 99.5; 80.1; 78.6; 72.4; 72.0; 69.1; 60.7
S = 10.6%
Sulfate/carboxyl ratio = 2.20
$[\alpha]_{546}^{20} = +54°$ (C = 1% in H$_2$O)
$[\alpha]_{589}^{20} = +47°$ (C = 1% in H$_2$O)
free NH$_2$ = 0.0%
APTT = 1.7 μg/ml
Anti Xa = 20.6 μg/ml
Prolongation of the bleeding time >200% (1 mg/kg, i.v.)
Inhibition of the transmembrane flux of the oxalate = 73.5% (C = 100 μg/ml)
Inhibition of the phosphorylation of the proteins of membrane = 24% (C = 10 μg/ml)

Sodium commercial heparin ALFA 88-247

$^{13}$C-NMR spectrum (p.p.m.): 177.3; 177.1; 104.7; 102.0; 99.6; 79.2; 78.9; 78.7; 72.5; 71.9; 69.2; 62.8; 61.0; 60.7; 60.3.
S = 10.9%
Sulfate/carboxyl ratio = 2.1
$[\alpha]_{546}^{20} = +54°$ (C = 1% in H$_2$O)
$[\alpha]_{589}^{20} = +47°$ (C = 1% in H$_2$O)
free NH$_2$ = 0.27%
APTT = 0.7 μg/ml
Anti Xa = 30.3 μg/ml
Prolongation of the bleeding time >200% (1 mg/kg, i.v.)
Inhibition of the transmembrane flux of the oxalate = 69.2% (C = 100 μg/ml)
Inhibition of the phosphorylation of the proteins of membrane = 26% (C = 10 μg/ml)

Sodium commercial heparin ALFA 87-120

$^{13}$C-NMR spectrum (p.p.m.): 177.3; 104.7; 102.1; 99.5; 78.7; 72.5; 72.0; 69.2; 62.7; 60.8.
S = 11.4%
Sulfate/carboxyl ratio = 2.3
$[\alpha]_{546}^{20} = +57°$ (C = 1% in H$_2$O)
$[\alpha]_{589}^{20} = +55°$ (C = 1% in H$_2$O)
free NH$_2$ = 0.4%
APTT = 1.4 μg/ml
Anti Xa = 26.4 μg/ml
Prolongation of the bleeding time >200% (1 mg/kg, i.v.)
Inhibition of the transmembrane flux of the oxalate = 61.0% (C = 100 μg/ml)
Inhibition of the phosphorylation of the proteins of membrane = 23% (C = 10 μg/ml)

Sodium commercial heparin ALFA 87-163

$^{13}$C-NMR spectrum (p.p.m.): 177.6; 104.8; 102.0; 99.5; 78.6; 72.4; 72.0; 69.2; 62.7; 60.8.
S = 11.0%
Sulfate/carboxyl ratio = 2.0
$[\alpha]_{546}^{20} = +60°$ (C = 1% in H$_2$O)
$[\alpha]_{589}^{20} = +51°$ (C = 1% in H$_2$O)
free NH$_2$ = 0.6%
APTT = 2.1 μg/ml
Anti Xa = 23.4 μg/ml
Prolongation of the bleeding time >200% (1 mg/kg, i.v.)
Inhibition of the transmembrane flux of the oxalate = 79.2% (C = 100 μg/ml)
Inhibition of the phosphorylation of the proteins of membrane = 20% (C = 10 μg/ml)

Sodium low molecular weight heparin LMW ALFA 87-198

The sodium low molecular weight heparin LMW ALFA 87-198 was prepared by depolymerization with hydrogen peroxide in presence of cupric ions according to the method described in the International patent publication WO 86/06729. It shows the following chemical-physical characteristics:

$^{13}$C-NMR spectrum (p.p.m.): 177.73; 104.87; 102.0; 99.6; 80.2; 78.6; 72.4; 71.9; 69.2; 62.7; 60.6. Molecular weight = 4400 Dalton
S = 11.60%
Sulfate/carboxyl ratio = 2.31
$[\alpha]_{546}^{20} = +47°$ (C = 1% in H$_2$O)
$[\alpha]_{589}^{20} = +43°$ (C = 1% in H$_2$O)
free NH$_2$ = 0.0%
APTT = 8.5 μg/ml
Anti Xa = 40.6 μg/ml

EXAMPLE 1

1.8 Grams of ALFA 87-81 heparin are added to 45 ml of an aqueous solution containing 0.4 g of sodium hydroxide (0.225N), 2.3 g of sodium acetate (0.625N) and 10 mg of sodium borohydride.

The obtained solution is thermostated for a period of time of 3.5 hours at 95° C. and then is cooled to room temperature, brought to neutrality with glacial acetic acid and to it are added 2.5 volumes of ethanol. The precipitate is collected on the filter, washed with a 2% solution (w/v) of sodium acetate in a 6:1 mixture of ethanol-water, then with a 6:1 mixture of ethanol-water and dried. 1.77 Grams of product are obtained whose $^{13}$C-NMR spectrum shows characteristic signals at the following δ (expressed as p.p.m.): 177.7; 104.6; 101.8; 101.3; 100.3; 98.2; 80.7; 78.9; 74.5; 73.7; 72.8; 71.4; 68.9; 62.7; 61.4; 60.7.
S=7.35%
Sulfate/carboxyl ratio=1.50
$[\alpha]_{546}^{20} = +26°$ (C=1% in H$_2$O)
$[\alpha]_{589}^{20} = +24°$ (C=1% in H$_2$O)
free NH$_2$=1.22%
APTT=124.0 μg/ml
Anti Xa=41.2 μg/ml
Prolongation of the bleeding time=19% (1 mg/kg, i.v.)
Protection against the thrombosis versus the starting product=10% (1 mg/kg, i.v.)
Inhibition of the transmembrane flux of the oxalate=61.0% (C=100 μg/ml)
Inhibition of the phosphorylation of the proteins of membrane=20% (C=10 μg/ml)

EXAMPLE 2

30 Grams of ALFA 88-247 heparin are added to an aqueous solution containing sodium hydroxide (6.75 g; 0.225N) and sodium borohydride (200 mg).

The solution is thermostated at 90° C. for a period of time of 4 hours, brought to neutrality with acetic acid and dialyzed for one night with current water and for 6 hours with distilled water. The dialyzate is freeze-dried obtaining 26.4 g of product whose $^{13}$C-NMR spectrum shows characteristic signals at the following δ (expressed as p.p.m.): 177.8; 104.7; 101.9; 101.4; 98.4; 80.6; 79.8; 79.3; 79.0; 74.0; 73.5; 72.8; 71.8; 69.0; 62.7; 61.3; 61.1; 60.8.
S=7.7%
Sulfate/carboxyl ratio=1.30
$[\alpha]_{546}^{20} = +33°$ (C=1% in H$_2$O)
$[\alpha]_{589}^{20} = +28°$ (C=1% in H$_2$O)
free NH$_2$=1.20%
APTT=16.7 μg/ml
Anti Xa=44.7 μg/ml
Prolongation of the bleeding time=46% (1 mg/kg, i.v.)
Protection against the thrombosis versus the starting product=70% (1 mg/kg, i.v.)
Inhibition of the transmembrane flux of the oxalate=74.4% (C=100 μg/ml)
Inhibition of the phosphorylation of the proteins of membrane=28% (C=10 μg/ml)

EXAMPLE 3

30 Grams of ALFA 87-120 heparin are added to 750 ml of an aqueous solution containing sodium hydroxide (6.75 g; 0.225N). The solution is thermostated at 90° C. for a period of time of 4 hours, then the reaction mixture is neutralized with acetic acid, dialyzed for 24 hours with current water and for 6 hours with distilled water. The dialyzate is freeze-dried obtaining 26.2 g of product whose $^{13}$C-NMR spectrum shows characteristic signals at the following δ (expressed as p.p.m.): 177.7; 104.7; 101.9; 101.4; 80.6; 79.8; 79.0; 74.8; 73.4; 72.8; 71.8; 71.3; 69.0; 62.7; 61.3; 61.0.
S=7.7%
Sulfate/carboxyl ratio=1.38
$[\alpha]_{546}^{20} = +32°$ (C=1% in H$_2$O)
$[\alpha]_{589}^{20} = +30°$ (C=1% in H$_2$O)
free NH$_2$=1.30%
APTT=18.9 μg/ml
Anti Xa=44.8 μg/ml
Prolongation of the bleeding time=57% (1 mg/kg, i.v.)
Protection against the thrombosis versus the starting product=37.5% (1 mg/kg, i.v.)
Inhibition of the transmembrane flux of the oxalate=65.2% (C=100 μg/ml)
Inhibition of the phosphorylation of the proteins of membrane=21% (C=10 μg/ml)

EXAMPLE 4

10 Grams of ALFA 87-163 heparin are added to 250 ml of an aqueous solution containing sodium hydroxide (2.25 g; 0.225N), sodium acetate (12.81 g; 0.625N) and sodium borohydride (50 mg).

The solution is thermostated at 90° C. for 4 hours and then is cooled to room temperature, neutralized with an aqueous solution of acetic acid and dialyzed for 24 hours with current water and for 6 hours with distilled water. The dialyzate is freeze-dried obtaining 7.8 g of product whose $^{13}$C-NMR spectrum shows characteristic signals at the following δ (expressed as p.p.m.): 177.7; 104.6; 101.9; 101.4; 98.6; 98.4; 80.3; 79.8; 79.4; 79.0; 73.8; 72.9; 69.1; 62.6; 61.3; 60.6.
S=7.8%
Sulfate/carboxyl ratio=1.35
$[\alpha]_{546}^{20} = +37°$ (C=1% in H$_2$O)
$[\alpha]_{589}^{20} = +30°$ (C=1% in H$_2$O)
free NH$_2$=2.01%
APTT=60.1 μg/ml
Anti Xa=82.0 μg/ml
Prolongation of the bleeding time=18% (1 mg/kg, i.v.)
Protection against the thrombosis versus the starting product=12.5% (1 mg/kg, i.v.)
Inhibition of the transmembrane flux of the oxalate=62.6% (C=100 μg/ml)
Inhibition of the phosphorylation of the proteins of membrane=19% (C=10 μg/ml)

EXAMPLE 5

450 Ml of an aqueous solution containing 4 g of sodium hydroxide (0.225 N), 23 g of sodium acetate (0.625 N), 100 mg of sodium borohydride and 18 g of ALFA 87-163 heparin are thermostated at 60° C. for 3.5 hours. One-half volume of the solution is taken, cooled to room temperature, brought to neutrality with glacial acetic acid and poured into 2.5 volumes of ethanol. The precipitate is collected on the filter, washed with a 6:1 mixture of ethanol-water and dried. 8 Grams of product, similar to the heparinic derivatives described in the Italian patent application No. 3504 A/88, are obtained. The $^{13}$C-NMR spectrum of this product shows characteristic signals at the following δ (expressed as p.p.m.): 177.3; 104.3; 101.9; 99.5; 98.4; 97.2; 96.8; 79.8; 79.2; 78.6; 72.2; 71.9; 71.3; 68.9; 62.6; 60.6; 60.3; 54.2; 53.2.

This product shows the following chemical-physical characteristics:
S=8.25%
Sulfate/carboxyl ratio=1.68
$[\alpha]_{546}^{20} = +68°$ (C=1% in H$_2$O)
$[\alpha]_{589}^{20} = +56°$ (C=1% in H$_2$O)
free NH$_2$=0.67%

The product is dissolved in 150 ml of distilled water and the solution is thermostated at 75° C. for 24 hours. After cooling to room temperature, the solution is brought to neutrality, 3 g of sodium acetate is added and poured into 2.5 volumes of ethanol. The obtained precipitate is washed with a 6:1 mixture of ethanol-water and dried.

6.8 Grams of product are obtained whose $^{13}$C-NMR spectrum shows characteristic signals at the following δ

(expressed as p.p.m.): 177.2; 104.8; 101.9; 101.3; 80.8; 80.5; 79.5; 78.9; 74.6; 73.8; 73.0; 71.8; 71.6; 69.0; 63.2; 61.4; 60.8.
S=6.30%
Sulfate/carboxyl ratio=1.33
$[\alpha]_{546}^{20} = +26°$ (C=1% in H$_2$O)
$[\alpha]_{589}^{20} = +21°$ (C=1% in H$_2$O)
free NH$_2$=1.5%
APTT=111.9 μg/ml
Anti Xa=55.5 μg/ml
Prolongation of the bleeding time=16% (1 mg/kg, i.v.)
Protection against the thrombosis versus the starting product=12.5% (1 mg/kg, i.v.)
Inhibition of the transmembrane flux of the oxalate=68.1% (C=100 μg/ml)
Inhibition of the phosphorylation of the proteins of membrane=32% (C=10 μg/ml)

EXAMPLE 6

The second one-half volume of the solution coming from example 5 is neutralized with glacial acetic acid and thermostated at 75° C. for 24 hours. After cooling to room temperature, the solution is slowly poured into 2.5 volumes of ethanol. The precipitate is collected on the filter, washed with a 6:1 mixture of ethanol-water and dried. 7.2 Grams of product are obtained whose $^{13}$C-NMR spectrum shows characteristic signals at the following δ (expressed as p.p.m.): 177.3; 104.8; 101.8; 101.3; 80.8; 80.5; 79.5; 74.6; 73.8; 73.0; 71.8; 71.6; 68.9; 63.1; 61.4; 60.8.
S=6.32%
Sulfate/carboxyl ratio=1.36
$[\alpha]_{546}^{20} = +24°$ (C=1% in H$_2$O)
$[\alpha]_{589}^{20} = +20°$ (C=1% in H$_2$O)
free NH$_2$=1.49%
APTT=101.3 μg/ml
Anti Xa=53.9 μg/ml
Prolongation of the bleeding time=18% (1 mg/kg, i.v.)
Protection against the thrombosis versus the starting product=20% (1 mg/kg, i.v.)
Inhibition of the transmembrane flux of the oxalate=78.3% (C=100 μg/ml)
Inhibition of the phosphorylation of the proteins of membrane=26% (C=10 μg/ml)

EXAMPLE 7

12 Grams of low molecular weight heparin LMW ALFA 87-198 are added to 300 ml of an aqueous solution of sodium hydroxide (12 g; 1.0 N), sodium acetate (15 g; 0.625 N) and sodium borohydride (60 mg). The solution is thermostated at 60° C. for 4 hours, cooled to room temperature, brought to neutrality, dialyzed for 24 hours with current water and for 6 hours with distilled water. The solution is then freezedried obtaining 10 g of product similar to the heparinic derivatives obtained in the Italian patent application No. 3504 A/88, whose $^{13}$C-NMR spectrum shows characteristic peaks at the following δ (expressed as p.p.m.): 177.3; 104.8; 101.9; 100.3; 80.5; 80.1; 79.4; 72.7; 71.9; 69.0; 62.7; 60.6; 54.3; 53.2.
S=8.25%
Sulfate/carboxyl ratio=1.53
$[\alpha]_{546}^{20} = +63°$ (C=1% in H$_2$O)
$[\alpha]_{589}^{20} = +55°$ (C=1% in H$_2$O)
free NH$_2$=0.3%.

5 Grams of this heparinic derivative are dissolved in 100 ml of distilled water and the solution is thermostated for 24 hours at 75° C., cooled to room temperature, brought to neutrality and freeze-dried obtaining 3.2 g of product whose $^{13}$C-NMR spectrum shows characteristic peaks at the following δ (expressed as p.p.m.): 177.6; 104.6; 101.8; 101.3; 80.7; 78.9; 74.4; 73.6; 72.7; 71.3; 69.1; 62.7; 61.3; 60.8.
S=6.80%
Sulfate/carboxyl ratio=1.52
$[\alpha]_{546}^{20} = +19°$ (C=1% in H$_2$O)
$[\alpha]_{589}^{20} = +16°$ (C=1% in H$_2$O)
free NH$_2$=0.4%
Prolongation of the bleeding time=19% (1 mg/kg, i.v.)
APTT=71.2 μg/ml
Anti Xa=71.2 μg/ml
Protection against the thrombosis versus the starting product=20% (1 mg/kg, i.v.)
Inhibition of the transmembrane flux of the oxalate=68.9% (C=100 μg/ml)
Inhibition of the phosphorylation of the proteins of membrane=20% (C=10 μg/ml)

We claim:

1. A heparin derivative having a $^{13}$C-NMR spectrum in the zone between 102 and 92 p.p.m. with the presence of a characteristic signal at about 101.3 p.p.m., a specific rotatory power at 546 nm between about =15° and about +40° in aqueous solution, a sulfur content between about 6% and about 9%, a sulfate/carboxyl ratio between about 1.20 and about 1.70 and a free amino group content between about 0.4% and about 2.1%.

2. A process for the preparation of a heparin derivative having a $^{13}$C-NMR spectrum in the zone between 102 and 92 p.p.m. with the presence of a characteristic signal at about 101.3 p.p.m., a specific rotatory power at 546 nm between about +15° and about +40° in aqueous solution, a sulfur content between about 6% and about 9%, a sulfate/carboxyl ratio between about 1.20 and about 1.70 and a free amino group content between about 0.4% and about 2.1%, which consists essentially of reacting an aqueous solution containing a commercial, purified or low molecular weight heparin, with a 0.01N-1N solution of an alkali or alkaline earth metal base for a period of time between about 0.5 and about 24 hours at a temperature between 75° C. up to the boiling temperature of the reaction mixture, and isolating said heparin derivative from the reaction mixture.

3. The process according to claim 2 wherein said reaction mixture is purified by percolation through an ion exchange column or by dialysis and said heparin derivative is precipitated by adding about 2 to about 4 volumes of an alcohol containing from 1 to 3 carbon atoms at an about neutral pH or by freeze-drying.

4. The process according to claim 2 wherein at least one of a) a salt which is sodium, potassium, barium, calcium, magnesium acetate or chloride or sodium, potassium, magnesium sulfate and b) a reducing agent is added to said alkali or alkaline earth metal base solution.

5. The process for the preparation of a heparin derivative having a $^{13}$C-NMR spectrum in the zone between 102 and 92 p.p.m. with the presence of a characteristic signal at about 101.3 p.p.m., a specific rotatory power at 546 nm between about +15° and about +40° in aqueous solution, a sulfur content between about 6% and about 9%, a sulfate/carboxyl ratio between about 1.20 and about 1.70 and a free amino group content between about 0.4% and about 2.1% which consists essentially of the steps of 1) reacting an aqueous solution containing a commercial, purified or low molecular weight heparin with a 0.01N-1N solution of a base of an alkali or alkaline-earth metal for a period of time of about 0.5 up to about 24 hours at a temperature of about 40° C.–70° C., isolating a reaction product by purification of the reaction mixture through an ion exchange column or by dialysis followed by precipitation by adding about 2 to about 4 volumes of an alcohol containing from 1 to 3 carbon atoms an about neutral pH or by freeze-drying, and 2) heating an aqueous solution of said reaction product from step 1) at a temperature between 75° C. and the boiling temperature of the reaction mixture for a period of time between about 0.5 and about 24 hours and isolating said heparin derivative from the solution of the reaction mixture.

6. The process according to claim 5 wherein at least one of a) a slat of an alkali or alkaline earth metal or b) a reducing agent is added in step 1) to said solution of said base.

7. The process according to claim 6 wherein said reaction mixture is purified in step 2) by percolation through an ion exchange column or by dialysis, and said heparin derivative is isolated by precipitation by adding to the solution of said reaction mixture from about 2 to 4 volumes of an alcohol containing from 1 to 3 carbon atoms at about neutral pH or by freeze-drying.

8. The process for the preparation of a heparin derivative having a $^{13}$C-NMR spectrum in the zone between 102 and 92 p.p.m. with the presence of a characteristic signal at about 101.3 p.p.m., a specific rotatory power at 546 nm between about +15° and about +40° in aqueous solution, a sulfur content between about 6% and about 9%, a sulfate/carboxyl ratio between about 1.20 and about 1.70 and a free amino group content between about 0.4% and about 2.1%, which consists essentially of reacting an aqueous solution containing a commercial, purified or low molecular weight heparin with 0.01N–1N solution of a base of an alkali or alkaline earth metal for a period of time between about 0.5 and about 24 hours at a temperature of about 40° C.–70° C., bringing the reaction mixture to neutral pH, thermostating it at a temperature between about 75° C. and the boiling temperature of the reaction mixture for a period of time between about 0.5 and about 24 hours and isolating said heparin derivative from said reaction mixture.

9. The process according to claim 8 wherein at least one of a) a salt of an alkali or alkaline earth metal and b) a reducing agent is added to said aqueous solution of said base.

10. The process according to claim 8 wherein said reaction mixture is purified by percolation through an ion exchange column or by dialysis and said heparin derivative is isolated by precipitation by adding to said reaction mixture from about 2 to about 4 volumes of an alcohol containing from 1 to 3 carbon atoms at about neutral pH, or by freeze-drying.

11. The process according to claim 6 wherein the base is sodium, potassium or barium hydroxide and the salt is the acetate or the chloride of sodium, potassium, barium, calcium and magnesium or the sulfate of sodium, potassium and magnesium, the reducing agent is sodium borohydride and said heparin derivative is precipitated by addition of 2.5 volumes of ethyl alcohol to said reaction mixture.

12. The process according to claim 9 wherein the base is sodium, potassium or barium hydroxide and the salt is the acetate or the chloride of sodium, potassium, barium, calcium and magnesium or the sulfate of sodium, potassium and magnesium, the reducing agent is sodium borohydride and said heparin derivative is precipitated by addition of 2.5 volumes of ethyl alcohol to said reaction mixture.

13. The method of treating a subject affected by nephrolithiasis which consists of administering to said subject the heparin derivative according to claim 1 by the parenteral or subcutaneous route.

* * * * *